Sept. 23, 1941. H. BRENNEISEN Re. 21,903
STRAPPING MATERIAL FOR BINDING OR SECURING BOXES, BALES, PARCELS, AND OTHER PACKAGES AND PROCESS FOR MANUFACTURING THE SAME
Original Filed Nov. 25, 1936
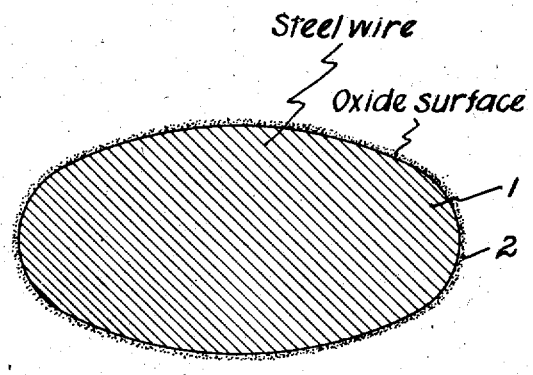
INVENTOR.
Hermann Brenneisen
BY Darby & Darby.
ATTORNEYS.

Reissued Sept. 23, 1941 Re. 21,903

UNITED STATES PATENT OFFICE 21,903

STRAPPING MATERIAL FOR BINDING OR SECURING BOXES, BALES, PARCELS, AND OTHER PACKAGES AND PROCESS FOR MANUFACTURING THE SAME

Hermann Brenneisen, Paris, France

Original No. 2,122,856, dated July 5, 1938, Serial No. 112,703, November 25, 1936. Application for reissue December 30, 1939, Serial No. 311,926. In Belgium December 4, 1935

11 Claims. (Cl. 29—148)

The invention concerns the strapping of packing cases, bales and other parcels or packages by means of a steel strap of oval or oblong cross-section, and also a so-called iron strap, which is really a low grade steel strap, which is tightened around the case and then has its ends frictionally joined together by intertwisting the overlapping ends to form a tie or joint.

In practice, many different methods of joining the ends of the tightened strap are adopted. Examples are, twisting the overlapping end portions of the strap around one another, twisting one portion around the other or twisting one around itself to form a sleeve to receive the other end and then flattening down or pressing them together, forming interengaging loops on the end portions and twisting the otherwise free ends of the loops around the adjacent portions of the strap.

Whatever form of the above kind of joint or knot is used, its strength, or the resistance to separation of the parts forming the joint, depends mainly, among other factors (for instance, tightness of the twist), on the coefficient of friction of the engaging surfaces of the material at the joint.

The single figure forming part of this specification is a more or less diagrammatic illustration of the oval form of strapping material of this invention shown in cross-section to illustrate as well as may be possible the nature of the invention. The figure shows in cross-section a strapping wire 1 made of cold-rolled hard drawn steel wire having an adherent layer 2 of an oxide of the wire over its entire longitudinal surface.

In order to obtain a joint having a high resistance to separation (all other conditions remaining unaltered), it is, therefore, important that smoothness of the engaging surfaces of the material at the point should be avoided as much as possible, that is to say, the surfaces of the material should be provided with retaining and clinging unevennesses or prominencies.

Hitherto prominencies such as teeth, projections, serrations, etc., have been formed on strapping by mechanical means, but unevennesses obtained by mechanical means are liable to weaken the strapping and are also apt to start fracture, that is to say, they may be regarded as starting points of fracture. It has also been proposed to etch a helix on one end of a wire strap so as to provide it with a rough or matt surface, the helix receiving the other smooth or untreated end and being crushed onto it.

According to the invention, the increase in the coefficient of friction is obtained by subjecting the strapping material (that is, the steel wire), while in a heated condition, to the action of a medium which will then chemically react with the material at its surface so as to produce the required roughness. The strapping is then cooled at any desired rate.

The heating of the strapping material should only be such as to ensure that the reaction shall occur, so as to give the desired result, and with reasonable speed, and in no case should it be such as to alter substantially the mechanical characteristics of the material as regards tensile strength or resistance to shearing. For this reason, it will generally be found necessary to heat it to at least 220° C., but in no case beyond the point of transformation or critical point of the metal.

A suitable medium for the purpose of the invention is an oxidizing medium. The heated strapping material is exposed to the oxidizing medium during the heating operation, while it is cooling or during both operations, so long as it is exposed to the oxidizing medium at a temperature not below its lowest oxidation temperature, although it may be still exposed to it even after it has cooled below this temperature, for instance, when the oxidizing medium is used also as a cooling medium.

Air is an example of a suitable oxidizing medium which may also be used as a cooling medium.

This treatment at a moderate temperature and in an oxidizing medium modifies the superficial structure of the strapping material.

It would appear from microscopic examination of steel wire strapping material treated as above in air as an oxidizing medium that the oxidation results in a coating of oxides being formed on the surface of the strapping material, which coating comprises very tenacious microscopic unevennesses or prominencies which render said surface rough or granular.

In view of the fact that the temperature of the treatment does not reach the point of transformation or critical point of the metal, it will be appreciated that there is no question of annealing or superficial hardening as these terms are generally understood in the art of steel treatment, which is borne out by tests which have shown that the mechanical characteristics of the metal (tensile strength and resistance to shearing stress) remain substantially unchanged; therefore, the result obtained is a superficial structure modification through oxidation.

It should be noted, moreover, that the external oxidation does not afterwards diffuse itself inwards in the strapping materials and that it constitutes a practical protection against rust. Therefore, a strapping material treated in the described manner can be used after a considerable period following the treatment without further oxidation.

A very advantageous application of the oxidation treatment refers to wire of oval section, or more generally, to wire of oblong cross section, obtained by the cold-rolling of hard drawn round commercial wire, sometimes termed market wire. This non-circular wire presents numerous well known advantages and the alteration of the section by a cold-rolling operation is relatively easy. However, it may have the disadvantage of effecting a kind of polishing or burnishing of the surface of the wire, so that the contacting surfaces of a strapping joint made from such wire would have such a low coefficient of friction, that even in the case of a very tight joint having twists of short pitch, there is always the danger of the wires sliding easily relatively to one another.

If oval wire or wire of oblong cross section, which has been produced by cold-rolling round wire, is submitted to the treatment according to the invention, the smooth surface of the wire due to the cold-rolling is so modified that the coefficient of friction of the contact surfaces of a strapping joint made from the treated wire is considerably increased. The non-round wire so treated possesses all the advantages of a non-round strapping wire of high quality with the additional guarantee of a highly resistant joint or knot.

The invention, therefore, includes as a preferred means of strapping, a steel wire of oval or oblong cross section, obtained by the cold-rolling of a hard drawn round commercial wire, and the heating of the wire, after rolling, above 220° C., but below the critical point of the metal, with a simultaneous or consecutive treatment in an oxidizing medium, the oxidizing treatment being carried out while the wire is in a heated condition.

It is to be understood that the treatment according to the invention may be applied to the end portions only of the strapping wire, for instance, when it is cut up into portions of definite lengths.

As the treatment can be applied continuously on strapping wire which travels through a heating zone, or on a strapping wire in which the heat is generated by an electric current passing through it, it appears to be more advantageous to apply the treatment to the whole length of the strapping wire immediately after the cold-rolling of the round wire from which it is made.

It is to be understood that the treatment according to the invention may be applied quickly, that is to say, that the strapping wire need not necessarily be maintained for a long time at the heating temperature, above 220° C. As soon as the required temperature has been reached, cooling can be started and thus the essential mechanical or physical characteristics of the strapping wire are not substantially modified or impaired.

As another example, the steel strapping wire may be heated with sulphur in a non-oxidizing atmosphere at a temperature above 220° C. Iron treated in this way results in the formation of iron sulphide.

The steel wire may be passed through a box having a layer of sulphur below and spaced from the wire and a gasoline flame may be directed into the box above and onto the wire. This results in a matt and rather dark and dull blue surface on the wire. Tests with strapping composed of a hard steel commercial wire of oval section of a breaking strength of 195 kgs. treated in this way showed that the wire of a twisted tie broke between 160–172 kgs., but the twisted joint or tie did not unwind.

Having now described my invention what I claim as new and desire to secure by Letters Patent is:

1. Cold-shaped metal strapping of oblong cross-sectional shape for strapping boxes, parcels, bales, packages and containers of any kind, the ends of which are adapted to be frictionally joined together by twisting provided with a superficial adhering coat of a sulphide of the metal of which said strapping is made.

2. Cold-shaped steel strapping of oblong cross-sectional shape for strapping boxes, parcels, bales, packages and containers of any kind, the ends of which are adapted to be frictionally joined together by twisting provided with a superficial adhering coat of iron sulphide.

3. Cold-shaped steel strapping of oblong cross-sectional shape for strapping boxes, parcels, bales, packages and containers of any kind, the ends of which are adapted to be frictionally joined together by twisting provided with a superficial adhering coat of an oxide of the metal of which said strapping is made.

4. Cold-shaped steel strapping for strapping boxes, parcels, bales, packages and containers of any kind, the ends of which are adapted to be joined together by twisting, comprising a steel wire having an oblong cross section and provided with a superficial adhering rough chemical reaction coating of high frictional characteristics at least at the portions forming the ends to be twisted.

5. Cold-shaped metal strapping of oval shape for strapping boxes, parcels, bales, packages and containers of any kind, comprising a length of strapping material, the ends of which are adapted to be frictionally joined together by twisting, one at least of said ends being provided with a highly frictional superficial adhering rough coating comprising a chemical reaction product of the metal of the strapping.

6. A process for manufacturing metal strapping for strapping boxes, parcels, bales, packages and containers of any kind, which consists in cold-rolling hard drawn round steel wire into wire of oblong cross section, heating the non-round wire to a temperature above 220 degrees C., but below the critical point of the metal, and subjecting the surface of said wire while hot to the action of a medium adapted to form with said metal a stable adhering coat of increased friction coefficient.

7. A process according to claim 6, in which the heating of the wire is effected immediately following the cold rolling operation.

8. A process according to claim 6, in which said medium is an oxidizing medium.

9. A process according to claim 6, in which said medium is a sulphurous medium.

10. A cold-shaped metal strapping for strapping boxes and the like, the ends of which are adapted to be frictionally joined by twisting, simultaneously possessing a high tensile strength induced by the strains of the cold-shaping, an oblong cross-section adapted to withstand torsion and an adhering rough coating of high frictional characteristics at least at the ends thereof, said coating comprising a stable compound of the metal of the strapping.

11. A process for improving the frictional characteristics of cold-shaped strapping wire of oblong cross-sectional shape for strapping purposes, which consists in heating the cold shaped wire to a temperature above 220 degrees C., but below the critical point of the metal, so as to impart to the surface of the wire an increased coefficient of friction.

HERMANN BRENNEISEN.